United States Patent

[11] 3,625,775

[72] Inventors Douglas J. MacKenzie
Park Ridge;
Frank Accettura, Elmwood Park; Peter F. Hansen, Niles, all of Ill.
[21] Appl. No. 732,788
[22] Filed Dec. 29, 1967
[45] Patented Dec. 7, 1971
[73] Assignee American Standard, Inc.
New York, N.Y.

[54] REINFORCED THERMOCOUPLE JUNCTION
3 Claims, 5 Drawing Figs.
[52] U.S. Cl. .................................................. 136/233,
136/226
[51] Int. Cl. ..................................................... H01v 1/04
[50] Field of Search ........................................ 136/230–234,
226

[56] References Cited
UNITED STATES PATENTS
521,168  6/1894  Jungner ........................ 136/233 X
2,012,112  8/1935  States ........................... 136/233 X
2,032,407  3/1936  Frickey ........................ 136/221
2,177,033  10/1939  Buell ............................ 136/232
2,311,886  2/1943  Thomas ........................ 136/232 X
2,339,809  1/1944  Ray ............................... 136/233 X
3,317,353  5/1967  Bingham ...................... 136/233
FOREIGN PATENTS
619,652  10/1935  Germany ..................... 136/233
461,370  2/1937  Great Britain ............... 136/230

*Primary Examiner*—Carl D. Quarforth
*Assistant Examiner*—Harvey E. Behrend
*Attorneys*—Leonard S. Knox and Robert G. Crooks ABSTRACT: A thermocouple junction comprising at least two wires in twisted or side-by-side relation, the junction being reinforced against failure by embrittlement by another wire or ribbon wound thereover, the several wires being anchored at a common point by fusion.

INVENTORS
Douglas S. MacKenzie
Peter F. Hansen
Frank Accettura

Leonard S. Knox
Attorney

REINFORCED THERMOCOUPLE JUNCTION

This invention relates to a thermocouple comprising at least a pair of contiguous wires capable of yielding a thermoelectric effect, an end portion of the wires being twisted together or positioned in side-by-side relation and the contiguous portions being tightly wound with another wire or ribbon to preclude mechanical failure of the junction, such as may occur due to embrittlement under heat. In general, any noble or refractory metal that is used at extreme temperatures where differential expansion between the wires and adjacent insulation or sheath materials, could induce fracture in the junction. In another aspect the invention has relation to the support and insulation of a junction as thus constituted by means of refractory material. In still another aspect the invention relates to the assembly of the junction and refractory material in a metallic sheath. Additionally, the tip of the junction and wrapping wire may be welded in a restricted zone for greater reliability.

The principal object of the invention is to preclude open circuits which may otherwise be induced by embrittlement of the junction due to temperature changes. The embrittlement referred to occurs as the junction is repeatedly heated and cooled and the crystalline structure of the metals is not properly reconstituted.

Another object is to increase the service life of the thermocouple.

The invention is applicable to thermocouple wires which are themselves solid, twisted or braided, and the wrapping wire is generally solid, but it, also, may be twisted or braided and of any desired cross-sectional configuration, although round and ribbon forms are within the scope of the invention.

In accordance with the invention welding or brazing is avoided over the principal extent of the wrapping wire but it is within contemplation, as a safety feature, to secure the ends of the same by welding or brazing. However, it will be understood that the step of welding or brazing, unless carefully controlled, can induce embrittlement.

At least one turn of wrapping wire will contribute to the low-resistance path required in a thermoelectric junction, and all of the turns contribute to mechanical support. In the case of, say, a platinum-10 percent rhodium thermocouple the wrapping wire is preferably platinum. In the case of a tungsten, 3 percent rhenium-tungsten, 25 percent rhenium, the wrapping wire is preferably tungsten, 25 percent rhenium. All of these metals and alloys are capable of operation at ultrahigh temperatures, i.e. in excess of 2,000° F.

Other objects and advantages of the invention will become apparent from the following description which, taken with the accompanying drawing, discloses certain forms in which the principles of the invention may be embodied.
In this drawing.

Figure 1:
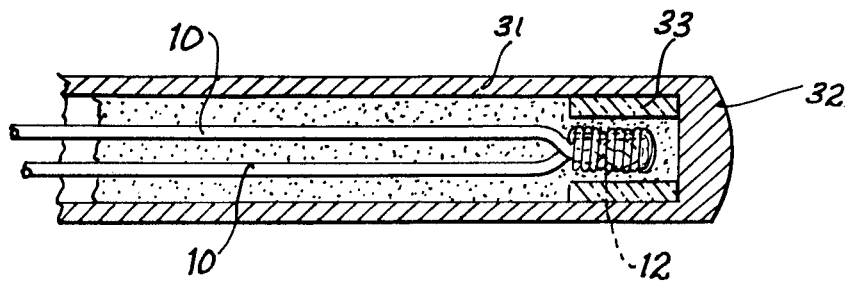
FIG. 1 is a longitudinal cross section of a portion of a sheathed thermocouple embodying the invention.
Figure 2:
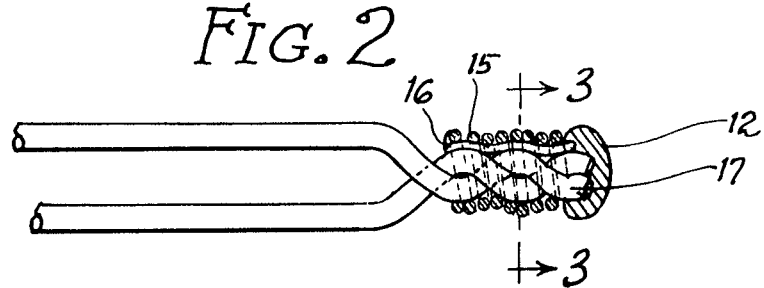
FIG. 2 is a side view of the thermocouple per se of FIG. 1, but enlarged.

Broadly regarded, the invention comprehends improvements in a thermocouple junction by the winding of a wire tightly around the twisted or otherwise contiguous ends of the wires comprising the junction, in order to mechanically reinforce the junction and preclude open circuiting which may arise from embrittlement. In a collateral phase the extreme end of the thermocouple wires and the wrapped wire may be unified by fusion, such as welding or brazing. Desirably the junction, as thus fabricated, is protected and electrically insulated by the use of a refractory material, e.g. a ceramic bushing. Alternatively the thermocouple element may be received in a metallic sheath together with electrically insulating material to isolate the thermocouple wires and junction from the sheath.

Thus, adverting to the drawing, there is shown a probe comprising a pair of wires 10—10 twisted together at their ends to constitute a thermoelectric junction 12. The wires comprising the junction can be of any recognized metal or alloy, e.g. platinum-10 percent rhodium and platinum. Around the junction a fine wire 15, e.g. of platinum, is tightly wound. A beginning length of this wire is first laid along the junction and the several turns overlaid thereon to anchor the beginning length. In the illustrative case winding will begin at the left, as at 16 so that the other end coils may be seized in a fused zone 17 to prevent ravelling.

This same zone is desirably deposited so as to encompass the ends of the thermocouple wires. It is to be noted that the weld is confined to the very ends of the wires to be anchored, for otherwise there exists the hazard of embrittlement due to the heat of welding. If the wrapping wire is wound sufficiently tightly and the free end adequately secured by tucking, the weld may be eliminated. It will be apparent that the wrapping wire provides mechanical reinforcement for the junction and improved intimacy of contact between the wires thereof and thus contributes materially in obtaining a low-resistance path between the wires comprising the junction.

The wrapping wire is preferably of the same class as the thermocouple wires, as mentioned above, and its cross-sectional area is equal to or smaller than the cross-sectional area of the thermocouple wires.

Alternatively the wrap may be effected by carrying an extended end of one of the wires 10 beyond the other, doubling this end back and winding the same around the contiguous portions of the wires 10—10. In this case also the free end of the wrap may be captured by welding or brazing, using due precaution to avoid the embrittling effects of heat.

The thermocouple as thus constituted is received in a metallic sheath closed in any well-known manner as at 32. A bushing 33 of refractory material, e.g. ceramic, surrounds the end of the thermocouple and provides mechanical protection and electrical insulation. The wires 10—10 are similarly protected and insulated by means of a compacted, pulverulent refractory, e.g. magnesium oxide, which will also fill the voids within the bushing 33. Alternatively the wires 10—10 may be threaded through ceramic beads having appropriate openings, as is common in this art.

Figure 4:
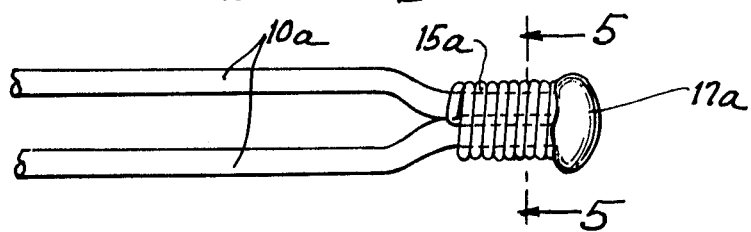
FIG. 4 is a view similar to FIG. 2 but in elevation, and with the thermocouple wires in side-by-side relation.
Figure 3:
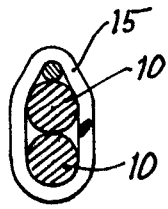
FIG. 3 is a cross section taken on the line 3—3 of FIG. 2.
Figure 5:
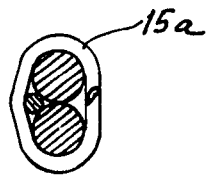
FIG. 5 is a cross section taken on the line 5—5 of FIG. 4.

FIG. 4 shows a modified form in which the thermocouple wires 10a, at the region of the junction are positioned side by side. The wrapping wire 15a and the fusion 17a are applied in the manner explained heretofore.

It has been demonstrated by comparison tests of two thermocouples, with and without the wrapping wire, that the number of cycles has been increased in the ratio of 10:1.

While we have shown particular embodiments of our invention, it will be understood, of course, that we do not wish to be limited thereto since many modifications may be made and we, therefore, contemplate by the appended claims to cover any such modifications as fall within the true spirit and scope of our invention.

We claim:

1. A thermocouple device for operation at temperatures on the order of 2,000° F. and above comprising a first and a second wire of dissimilar metals capable of yielding a thermoelectric effect, at least one of said wires being prone to recrystallization embrittlement due to thermal cycling at said temperatures, said wires having respective end portions in contiguous relation to form a region of contiguity, said region of contiguity constituting a thermocouple junction, a third wire having a beginning length extending along said region of contiguity contiguous to at least one of said first and second wires from substantially the end of the region of contiguity corresponding to the ends of said first and second wires to the opposite end of the region of contiguity and a coil portion tightly coiled around said first and second wires and said beginning length over said region of contiguity to place the same under compressive forces to maintain the integrity of the junction notwithstanding said tendency to embrittlement and to anchor said beginning length, said third wire substantially retaining its mechanical properties at said temperatures and having a cross-sectional area which is smaller than the cross-sectional area of said first and second wires, the end of said coil portion of said third wire nearest the end of said region of contiguity corresponding to the ends of said first and second wires being secured by a weldment, said weldment being confined to said end of said region of contiguity corresponding to the ends of the first and second wires and being spaced from the opposite end of said region of contiguity, a metallic sheath to receive and protect said junction, and refractory material intermediate said wires and sheath.

2. The combination in accordance with claim 1 in which said end portions are twisted together.

3. The combination in accordance with claim 1 in which said end portions are located in side-by-side relation.

* * * * *